Oct. 21, 1952 W. WOOD ET AL 2,614,977
MERCURY CATHODE ELECTROLYTIC CELL
Filed June 1, 1949 2 SHEETS—SHEET 1
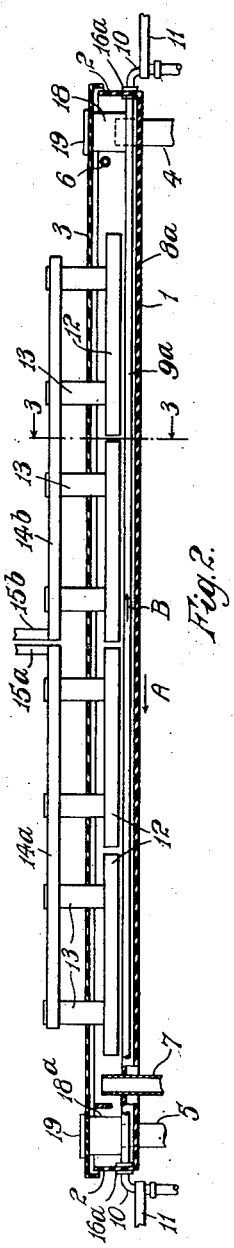
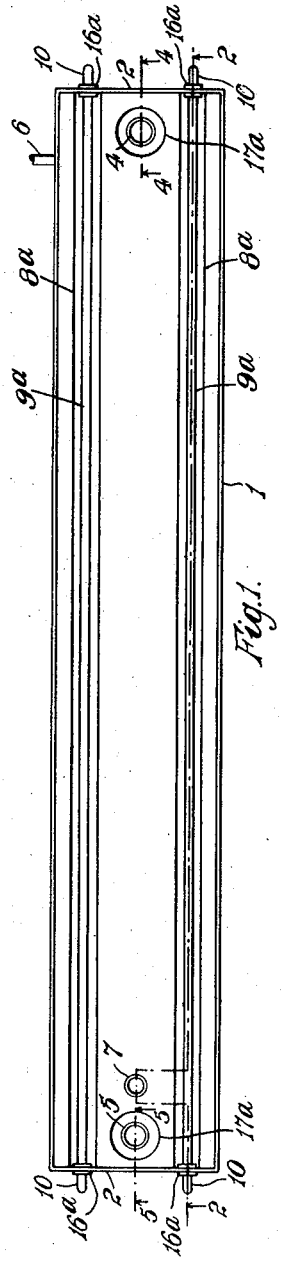
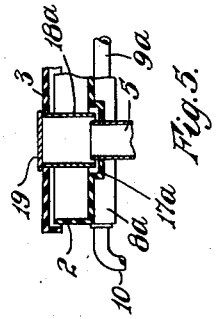
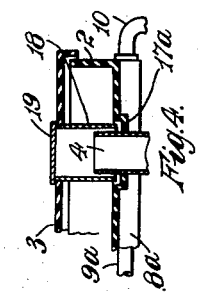
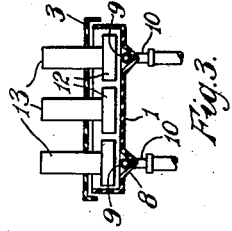
INVENTORS
WILLIAM WOOD
CHARLES EDWARD BOWEN
by Walter S. Pleston
ATTORNEY

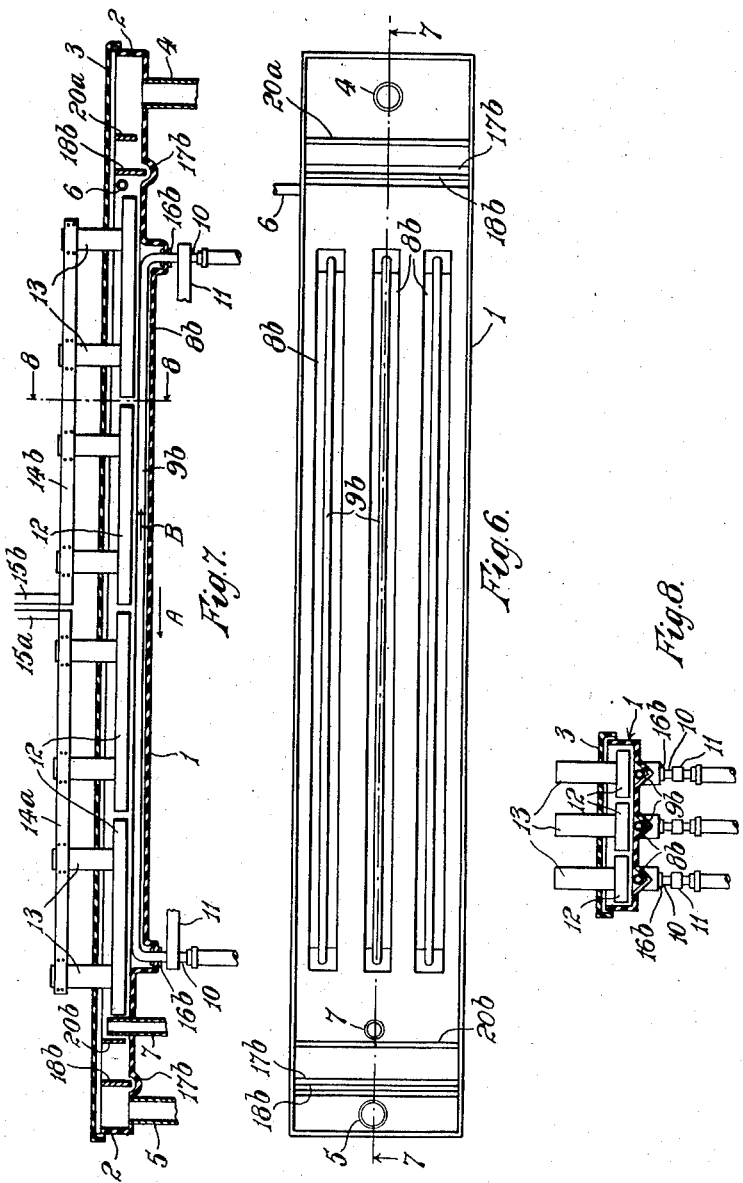

Patented Oct. 21, 1952

2,614,977

UNITED STATES PATENT OFFICE 2,614,977

MERCURY CATHODE ELECTROLYTIC CELL

William Wood, Hoole, Chester, and Charles Edward Bowen, Shotton, Chester, England, assignors of one-third to The International Electrolytic Plant Company Limited, Sandycroft, Chester, England, a British corporation Application June 1, 1949, Serial No. 96,514
In Great Britain June 8, 1948

8 Claims. (Cl. 204—219)

This invention is primarily concerned with the supply of current to electrolytic cells of the mercury cathode type, in such a way as to secure more uniform distribution of the current and better control of the operation of the cell.

According to the invention, the electric current is fed to the cathode by one or more conductors immersed in the mercury, whereby very intimate contact therewith can be obtained. The expression "immersed in the mercury" denotes that possibility of access of the mercury is not just confined to a top surface of the conductor as in known types of cell, but the expression is not intended to preclude the surface of the conductor being shielded in part from the mercury as for instance at places where the conductor is supported by the floor of the cell. Such immersion of a conductor makes possible a relatively large surface area of contact with the mercury, with little or no discontinuity or interruption of that part of the interior surface of the cell which is submerged by the mercury or of the lining thereof, so that for instance a rubber lining can be continued without break over the whole such surface except possibly where leads to the conductor or conductors are required to pass through it, thus avoiding extensive junctions under the mercury between lined and bare surfaces such as have hitherto frequently proved troublesome because of mercury seepage beneath the lining.

The cell floor may be recessed to accommodate the immersed conductor or conductors, the shape of the recess preferably so conforming with that of the conductor that the latter can be completely covered by the minimum quantity of mercury.

The conductor or each conductor may extend longitudinally of the cell, i. e., in the case of a flowing mercury cathode, in the direction of the flow, preferably continuously and substantially the whole length of the cell, and may be accommodated in one or more recessed channels in the floor of the cell which extend correspondingly. The floor is in effect corrugated by these channels which serve to stiffen the section of the cell, making possible a much lighter trough which can be fabricated in plastic if desired. The channels can conveniently be made of V cross-section to take cylindrical conductors, which need not rise appreciably above the general floor level.

The immersed conductor or conductors may be tubular to enable fluid e. g., cooling water to be passed through them for the purpose of controlling the temperature of the mercury. Such tubular conductors, or each of them, may project from the cell at both ends for connection to a circulating medium which can thus be distributed to best advantage throughout the bulk of the mercury, so that in spite of the relatively low co-efficient of heat conductivity of that metal, the temperature of the brine or other electrolyte can be effectively and uniformly controlled all along the cell by heat conduction through the mercury.

The immersed conductor or conductors may either extend to the end walls of the cell to project through one or both of them, with mercury inlet or outlet traps or seals in spaces between the conductors near the respective ends of the cell, or alternatively the conductor or conductors may extend only the greater part of the length of the cell between traps or seals occupying the respective end parts thereof. In the latter case the immersed conductor, or each of them, may turn down to project through the bottom of the cell at the end or ends of its channel.

The cell according to the invention may be provided with one or more anodes as well as one or more immersed cathodic conductors, both extending substantially the full length of the cell, either continuously or in units or sections interconnected by bus bars, the current supply to the respective electrodes or their bus bars being effected at points which are at maximum practicable spacing longitudinally of the cell for the purpose of rendering the voltage drop across the electrolyte as uniform as possible. The current lead to one of the electrodes may be connected thereto intermediately of the length of the cell, conveniently at a feed point about midway along the latter, the current leads to the other electrode being connected thereto at or near both ends of the cell. Thus negative current leads may be connected to opposite ends of the immersed conductor or conductors, so that the current can thereby be fed to the mercury near both ends of the cell simultaneously. In conjunction with this cathode current feed, the supply to the anode units may be effected through separate bus bars, or groups of such bars, extending oppositely from an intermediate feedpoint towards the ends of the cells. Alternatively the respective current leads may be connected to the anode or anodes and to the immersed conductor or conductors of the cathode at opposite ends of the cell.

The invention will now be more particularly described as embodied in the two alternative constructional forms of flowing mercury cathode cell shown in the accompanying more or less diagrammatic drawings whereof:

Figures 1, 2 and 3 are respectively a plan view, a longitudinal vertical section at 2—2 of Figure 1 and cross-section at 3—3 of Figure 2 (the cell cover and anode system being omitted from the plan) of the first form of cell having immersed conductors in the mercury cathode extending the whole length between the end walls of the cell.

Figures 4 and 5 being detail views along the lines 4—4 and 5—5 of Figure 1, showing the sealed mercury inlet and outlet at the respective ends of the cell; and whereof Figures 6, 7 and 8 are similar views to Figures 1, 2 and 3 of the second form of cell, in which the immersed conductors extend the greater part of the distance between end mercury seals occupying the full width of the cell.

In these illustrated arrangements, the cell comprises a trough 1 of insulating material as for instance a plastic, with end walls 2 and cover 3 and is intended for association with a denuder in known manner, the mercury inlet from the denuder being shown at 4 and the mercury outlet thereto being shown at 5. Fresh electrolyte, e. g., brine in the case of an alkali-chlorine cell, can be introduced into the cell by inlet 6 in the side wall near one end whilst near the other end of the cell is outlet 7 for the liberated gas, e. g., chlorine, and spent electrolyte. Both mercury and electrolyte therefore flow in the direction of arrow A.

The floor of the cell is formed with V-section channels 8 within which the cathode conductor tubes 9 are adapted to rest between the sides of the V, and with their top parts substantially on a level with the floor, so that they do not project above it. Negative bus bars 11 are clamped on both ends 10 of each of these conductor tubes where it extends outside the cell. Connection with a circulating medium can also be made if required to these projecting ends 10, e. g., cooling water arranged to flow in the direction of arrow B, opposite to that of the mercury and electrolyte.

The anode is composed of units or sections 12 suspended by means of their stems 13 from the cell cover 3, the upward extensions of which stems through the cover are clamped by the separate bus bars 14a and 14b extending respectively towards the opposite ends of the cell from the central feed point where the positive current leads 15a and 15b are grouped. Each unit 12 is thus connected exclusively to a bus bar on its own side of the feed point.

It should be observed that if half the length of either of the illustrated cells is considered, the positive lead would be connected at one end only of the cell and the negative lead at the other end only, this being a possible alternative arrangement within the scope of the invention in which the cathode conductor, although extending the whole or substantially the whole length of the cell, may have only a single projecting end.

The foregoing description has been concerned with features which both the illustrated forms of cell share in common. The differences between them have to do only with the arrangement of the ends of the cathode conductor tubes 9 and their disposition with respect to the sealing of the mercury inlet 4 and outlet 5.

In the case of the cell shown in Figures 1 to 5, there are only two conductor tubes 9a in troughs 8a, both extending the whole length of the cell, so that the ends of the tubes are able to extend straight through sealed glands 16a in the end walls 2 of the cell. The mercury inlet 4 and outlet 5 pipes in the floor of the cell, with their associated traps, are arranged in the spaces between the conductor tubes near the respective ends of the cell. The construction of these traps is clearly shown in Figures 4 and 5, from which it will be seen that in each of them an annular depression 17a is formed in the floor of the cell around the upwardly projecting pipe, into which depression depends the skirt of an outer tube 18a of larger diameter than the pipe. The top of this tube opens through the cell cover 3 by which it is supported, the opening being provided with a removable cover 19. It will be observed that the inlet pipe 4 projects much higher into its associated trap tube 18a than does the outlet pipe 5.

In the case of the cell shown in Figures 6 to 8, the mercury traps occupy the whole of each end of the cell, so that the conductor tubes 9b and their troughs 8b must terminate short of the cell ends, but the resulting loss of contact surface with the mercury can be made good by providing a third intermediate tube as shown. The tubes turn down to project through sealed glands 16b in the bottom of the cell at the ends of troughs 8b. The mercury traps are formed by means of transverse troughs 17b in the floor of the cell, into which the walls 18b depend from the cell cover 3 with associated baffles 20a on the near side of the trap at the inlet end and 20b on the far side of the trap at the outlet end.

We claim:

1. In a mercury cathode electrolytic cell, an elongated trough, at least one tubular conductor within said trough and adjacent the trough bottom and including means for connection to the negative pole of a current source, said conductor extending longitudinally of said trough for at least the major part of the length thereof, a mercury inlet near one end of said trough, a mercury outlet near the other end of said trough closely above said conductor, said conductor being exposed substantially throughout its entire surface interiorly of said trough, except where supported, to contact with said mercury flowing through said trough, the ends of said conductor projecting from said trough and including means for their connection to a source of a circulating fluid, and an anode above the level of said mercury outlet.

2. In a mercury cathode electrolytic cell, an elongated trough, at least one tubular conductor within said trough and adjacent the trough bottom, said conductor extending longitudinally of said trough for at least the major part of the length thereof, a mercury inlet near one end of said trough, a mercury outlet near the other end of said trough closely above said conductor, said conductor being exposed substantially throughout its entire surface interiorly of said trough except where supported, to contact with said mercury when flowing through said trough, the ends of said conductor projecting from said trough, the projecting ends of said conductor tube including means for their connection to a fluid source, and other means for the connection of both said ends to the negative pole of a current source, and an anode above the level of said mercury outlet.

3. In a mercury cathode electrolytic cell, an elongated trough, the bottom wall of said trough being corrugated so as to form at least one V- shaped groove extending longitudinally of said trough at least for the major length thereof, a mercury inlet near one end of said trough, a mercury outlet near the other end of said trough and closely above the floor level of said trough, a tubular conductor embedded in said groove without appreciably rising above said floor level of said trough, said conductor projecting from said trough with both its ends and being adapted to be connected to the negative pole of a current source, said projecting ends of said conductor including means for its connection to a source of a circulating fluid.

4. A device as claimed in claim 1, wherein the ends of said conductor project through the end walls of said trough respectively.

5. A device as claimed in claim 1, wherein a plurality of parallel tubular conductors are provided, said mercury inlet and said mercury outlet including traps in the space between said conductors, said traps being close to the opposite ends of the trough, respectively.

6. A device as claimed in claim 1, wherein said conductor is spaced from the ends of said trough, the ends of said conductor being turned down so as to project through the bottom of said trough.

7. A device as claimed in claim 1, said mercury inlet including a trap in said trough between its one end and the adjacent end of said conductor, and said mercury outlet including a trap between the other end of the trough and the other end of the conductor.

8. A device as claimed in claim 2, said anode extending substantially for the length of said trough, and further means to connect said anode approximately midway intermediate its ends to the other pole of said current source.

WILLIAM WOOD.
CHARLES EDWARD BOWEN.

REFERENCES CITED

The following references are of record in the file of this patent:

UNITED STATES PATENTS

| Number | Name | Date |
|---|---|---|
| 588,276 | Kellner | Aug. 17, 1897 |
| 652,761 | Entz | July 3, 1900 |
| 1,030,490 | Potter | June 25, 1912 |
| 1,724,928 | Hailwood | Aug. 20, 1929 |
| 2,067,361 | Vivian | Jan. 12, 1937 |
| 2,104,678 | Sorensen | Jan. 4, 1938 |
| 2,230,023 | Aten | Jan. 28, 1941 |
| 2,232,128 | Muller | Feb. 18, 1941 |

FOREIGN PATENTS

| Number | Country | Date |
|---|---|---|
| 22,406 | Great Britain | Dec. 8, 1900 |